United States Patent [19]
Jorissen et al.

[11] Patent Number: 5,025,056
[45] Date of Patent: Jun. 18, 1991

[54] THERMOPLASTIC COMPOSITIONS HAVING IMPROVED MELT FLOW

[75] Inventors: Steven A. Jorissen, Mars, Pa.; Charles E. Lundy, Leverkusen Bayerwerk, Fed. Rep. of Germany; Sivaram Krishnan, Pittsburgh, Pa.; Robson Mafoti, Pittsburgh, Pa.; Robert A. Pyles, Bethel Park, Pa.

[73] Assignee: Mobay Corporation, Pittsburgh, Pa.

[21] Appl. No.: 568,568

[22] Filed: Aug. 16, 1990

[51] Int. Cl.$^5$ .................. C08L 69/00; C08L 67/02
[52] U.S. Cl. .................................. 524/310; 524/308; 524/311; 525/439
[58] Field of Search .............. 525/439; 524/308, 310, 524/311

[56] References Cited
U.S. PATENT DOCUMENTS
4,778,855  10/1988  Boutni et al. ................... 525/146

FOREIGN PATENT DOCUMENTS
4020  9/1979  European Pat. Off. ............ 525/439

Primary Examiner—Melvyn I. Marquis
Assistant Examiner—David Buttner
Attorney, Agent, or Firm—Joseph C. Gil; Aron Preis

[57] ABSTRACT

Thermoplastic molding compositions containing at least one member selected from among aromatic polycarbonate and aromatic polyestercarbonate resins were plasticized by incorporating therewith a small amount of a copolyetherester conforming to

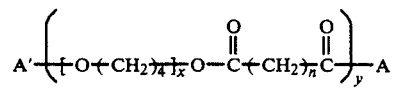

wherein x is about 2 to 15, n is about 3 to 10 and y is about 1 to 10. A and A' are end groups which may independently be a hydroxy group, a carboxy radical, a $C_1$-$C_8$ alkoxy or a $C_6$-050249762 $C_{10}$ aryloxy group. The compositions of the invention are characterized by their improved processability.

9 Claims, No Drawings

THERMOPLASTIC COMPOSITIONS HAVING IMPROVED MELT FLOW

FIELD OF THE INVENTION

The invention relates to thermoplastic molding compositions and in particular to compositions based on aromatic polycarbonates or aromatic polyestercarbonates to which is added an additive amount of a specific copolyetherester.

SUMMARY OF THE INVENTION

Thermoplastic molding compositions containing at least one member selected from among aromatic polycarbonate and aromatic polyestercarbonate resins were plasticized by incorporating therewith a small amount of a copolyetherester conforming to

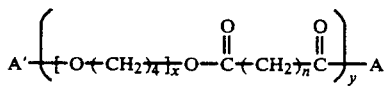

wherein x is about 2 to 15, n is about 3 to 10 and y is about 1 to 10. A and A' are end groups which may independently be a hydroxy group, a carboxy radical, a $C_1$—$C_8$ alkoxy or a $C_6$—$C_{10}$ aryloxy group. The compositions of the invention are characterized by their improved processability.

BACKGROUND OF THE INVENTION

Thermoplastic molding compositions based on aromatic polycarbonates and those based on aromatic polyester carbonates are well known. The physical and mechanical properties of these compositions make them suitable as engineering resins for a large variety of applications where durability and optical clarity are required. Due however to their relatively high melt flow indices, these materials are not easily processible and improvements have been sought. Notable in this regard is U.S. Pat. No. 4,778,855 which describes compositions containing a copolyetherester which consists essentially of a multiplicity of recurring intralinear long chain and short chain ester units connected head to tail through ester linkages.

DETAILED DESCRIPTION OF THE INVENTION

The present invention is directed to a thermoplastic molding composition comprising (i) at least one member selected from the group consisting of polycarbonate resin and aromatic polyestercarbonate, and (ii) a thermoplastic copolyetherester conforming to

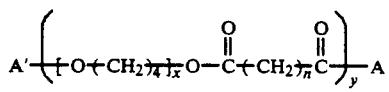

wherein x is about 2 to 15, preferably 3 to 10, n is about 3 to 10, preferably 4 to 7 and y is about 1 to 10, preferably 2 to 6. A and A' are end groups which may independently be a hydroxy group, a carboxy radical, a $C_1$—$C_8$ alkoxy or $C_6$—$C_{10}$ aryloxy group. The copolyetherester of the invention is characterized in that its weight average molecular weight is of the order of about 2000.

The compositions of the invention are characterized by their improved processability.

The amount of the copolyetherester to be incorporated in the composition of the invention is that amount which is effective to improve the melt flow of the resin (i). Preferably, the incorporated amount is about 0.5 to 20.0 percent relative to the weight of the composition. Preferably, the amount is about 1.0 to about 8 percent and most preferably the amount is about 2.0 to about 5.0 percent.

The copolyetherester may be prepared by a procedure such as described below.

Aromatic polycarbonates within the scope of the present invention are homopolycarbonates and copolycarbonates and mixtures thereof.

The polycarbonates generally have a weight average molecular weight of 10,000–200,000, preferably 20,000–80,000 and their melt flow rate, per ASTM D-1238 at 300° C., is about 1 to about 65 gm/10 min., preferably about 2–15 gm/10 min. They may be prepared, for example, by the know diphasic interface process from a carbonic acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,518; and the monograph H. Schnell, "Chemistry and Physics of Polycarbonates", Interscience Publishers, New York, N.Y., 1964, all incorporated herein by reference).

In the present context, dihydroxy compounds suitable for the preparation of the polycarbonates of the inventor conform to the structural formulae (1) or (2):

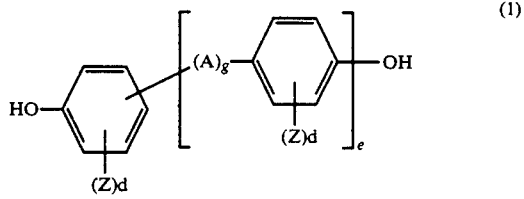

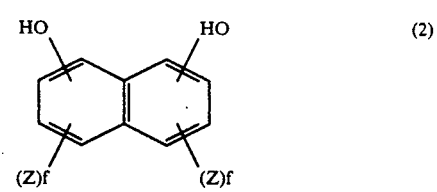

wherein

A denotes an alkylene group with 1 to 8 carbon atoms, an alkylidene group with 2 to 8 carbon atoms, a cycloalkylene group with 5 to 15 carbon atoms, a cycloalkylidene group with 5 to 15 carbon atoms, a carbonyl group, an oxygen atom, a sulfur atom, —SO— or —SO$_2$— or a radical conforming to

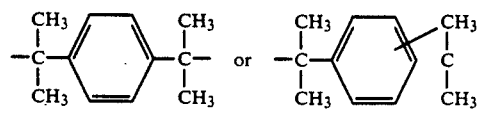

e and g both denote the number 0 to 1;

Z denotes F, Cl, Br or $C_1$—$C_4$—alkyl and if several Z radicals are substituents in one aryl radical, they may be identical or different from one another;

d denotes an integer of from 0 to 4; and f denotes an integer of from 0 to 3.

Among the dihydroxy compounds useful in the practice of the invention are hydroquinone, resorcinol, bis-(hydroxyphenyl) alkanes, bis-(hydroxyphenyl) ethers, bis-(hydroxyphenyl)-ketones, bis-(hydroxyphenyl)-sulfoxides, bis-(hydroxyphenyl)-sulfides, bis-(hydroxyphenyl)-sulfones, and α,α-bis-(hydroxyphenyl)-diisopropyl-benzenes, as well as their nuclear-alkylated compounds. These and further suitable aromatic dihydroxy compounds are described, for example, in U.S. Pat. Nos. 3,028,356; 2,999,835; 3,148,172; 2,991,273; 3,271,367; and 2,999,846, all incorporated herein by reference. Further examples of suitable bisphenols are 2,2-bis-(4-hydroxyphenyl)-propane (bisphenol A), 2,4-bis-(4-hydroxyphenyl)-2-methyl-butane, 1,1-bis-(4-hydroxyphenyl)-cyclohexane, α,α'-bis-(4-hydroxyphenyl)-p-diisopropylbenzene, 2,2-bis-(3-methyl-4-hydroxyphenyl)-propane, 2,2-bis-(3-chloro-4-hydroxyphenyl)-propane, bis-(3,5-dimethyl-4-hydroxyphenyl)-methane, 2,2,-bis-(3,5-dimethyl-4-hydroxyphenyl)-propane, bis-(3,5-dimethyl-4-hydroxyphenyl)-sulfide, bis-(3,5-dimethyl-4-hydroxyphenyl)-sulfoxide, bis-(3,5-dimethyl-4-hydroxyphenyl)-sulfone, hydroxy-benzophenone, 2,4-bis-(3,5-dimethyl-4-hydroxyphenyl)-cyclohexane, α,α'-bis-(3,5-dimethyl-4-hydroxyphenyl)-p-diisopropylbenzene and 4,4'-sulfonyl diphenyl.

Examples of particularly preferred aromatic bisphenols are 2,2-bis-(4-hydroxyphenyl)-propane, 2,2-bis-(3,5-dimethyl-4-hydroxyphenyl)-propane and 1,1-bis-(4-hydroxyphenyl)-cyclohexane.

The most preferred bisphenol is 2,2-bis-(4-hydroxyphenyl)-propane (bisphenol A).

The polycarbonates of the invention may entail in their structure units derived from one or more of the suitable bisphenols.

Among the resins suitable in the practice of the invention are included phenolphthalein-based polycarbonate, copolycarbonates and terpolycarbonates such as are described in U.S. Pat. Nos. 3,036,036 and 4,210,741, both incorporated by reference herein.

The polycarbonates of the invention may also be branched by condensing therein small quantities, e.g., 0.05–2.0 mol % (relative to the bisphenols) of polyhydroxyl compound. Polycarbonates of this type have been described, for example, in German Offenlegungsschriften 1,570,533; 2,116,974 and 2,113,374; British Patents 885,442 and 1,079,821 and U.S. Pat. No. 3,544,514. The following are some examples of polyhydroxyl compounds which may be used for this purpose: phloroglucinol; 4,6-dimethyl-2,4,6-tri(4-hydroxyphenyl)-heptane; 1,3,5-tri-(4-hydroxyphenyl)-benzene; 1,1,1-tri-(4-hydroxyphenyl)-ethane; tri-(4-hydroxyphenyl)-phenylmethane; 2,2-bis-[4,4-(4,4'-dihydroxydiphenyl)-cyclohexyl-propane; 2,4-bis-(4-hydroxy-1-isopropylidine)-phenol; 2,6-bis-(2'-dihydroxy-5'-methylbenzyl)-4-methylphenol; 2,4-dihydroxy-benzoic acid; 2-(4-hydroxyphenyl)-2-(2,4-dihydroxyphenyl)-propane and 1,4-bis-(4,4'-dihydroxytriphenylmethyl)-benzene. Some of the other polyfunctional compounds are 2,4-dihydroxy-benzoic acid, trimesic acid, cyanuric chloride and 3,3-bis-(4-hydroxyphenyl)2-oxo-2,3-dihydroindole.

In addition to the polycondensation process mentioned above, other processes for the preparation of the polycarbonates of the invention are polycondensation in a homogeneous phase and transesterification. The suitable processes are disclosed in the incorporated herein by references, U.S Pat. Nos. 3,028,365; 2,999,846; 3,153,008; and 2,991,273.

The preferred process for the preparation of polycarbonates is the interfacial polycondensation process.

Other methods of synthesis in forming the polycarbonates of the invention such as disclosed in U.S. Pat. No. 3,912,688, incorporated herein by reference, may be used.

Suitable polycarbonate resins are available in commerce, for instance, Makrolon FCR, Makrolon 2600, Makrolon 2800 and Makrolon 3100, all of which are bisphenol a based homopolycarbonate resins differing in terms of their respective molecular weights and characterized in that their melt flow indices (MFR) per ASTM D-1238 are about 16.5–24, 13–16, 7.5–13.0 and 3.5–6.5 gm/10 min., respectively. These are products of Mobay Corporation of Pittsburgh, Pa.

Other polycarbonate resin suitable in the practice of the invention is known and its structure and methods of preparation have been disclosed, for example in U.S. Pat. Nos. 3,030,331; 3,169,121; 3,395,119; 3,729,447; 4,255,556; 4,260,731; 4,369,303 and 4,714,746 all of which are incorporated by reference herein.

Essentially, the copolyestercarbonate resin conforms structurally to

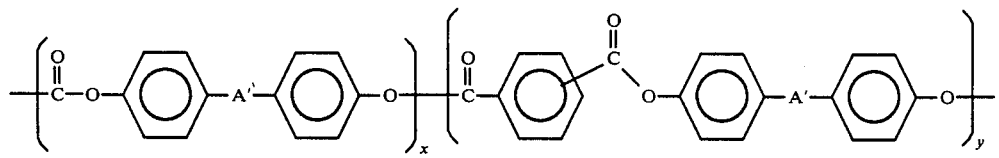

wherein x and y are the molar fractions of the respective blocks and they each are in the range of about 0.1 to 0.9 with the proviso that x+y=1.0, and A' and A" independently conform to A as defined above.

Preferably the copolycarbonate conforms to

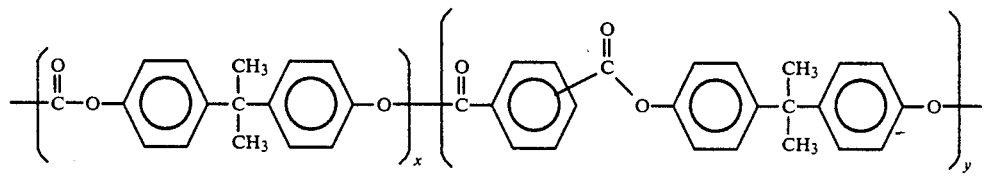

The polyestercarbonates of the invention have a weight average molecular weight of 10,000–200,000, preferably 20,000–80,000 and their melt flow rate, per ASTM D-1238 at 360° C., is about 1 to about 65 gm/10 min., preferably about 2-15 gm/10 min. They may be prepared by know methods, for instance such as were disclosed in German DOS 2,714,544. Suitable polyester carbonates have also been disclosed in German patents 2,758,030, and 3,016,019 as well as in European Patent 10,840 and in U.S. Pat. Nos. 3,351,624 and 3,207,814 all incorporated by the reference herein. Essentially, the polyestercarbonates of the invention are produced by reacting phthalic acid derivatives—essentially, a mixture of isophthalic and terephthalic acids—with an acid derivative such as phosgene and dihydroxy compounds by polycondensation (see German Offenlegungsschriften 2,063,050; 2,063,052; 1,570,703; 2,211,956; 2,211,957 and 2,248,817; French Patent 1,561,58; and the monograph H. Schnell, "Chemistry and Physics of Polycarbonates" Interscience Publishers, New York, 1964, all incorporated herein by reference).

The dihydroxy compounds suitable for the preparation of polycarbonates, mentioned above are also suitable for the preparation of the copolyestercarbonates. Similarly, the preferred aromatic dihydroxy compounds for the preparation of polycarbonates are also preferred in the context of the preparation of the copolyestercarbonates. The branching agents suitable in the preparation of polycarbonate resins are suitable here as well.

Suitable polyestercarbonates are available in commerce, for instance, under the trademark APEC, from Bayer AG or in the alternative from Mobay Corporation.

The compositions of the present invention may be prepared by following conventional procedures and equipment known in the art for the purpose. Conventional additives suitable for polycarbonate molding compositions may be incorporated in the instant compositions as well. These additives include stabilizers, mold release agents, flame retardants, reinforcing agents and fillers. The invention is illustrated below.

Experimental

Compositions in accordance with the invention were prepared and their properties determined. In the set of experiments which are summarized below. The preparation of a polyetherester suitable in accordance with the invention was carried out as follows:

A 12 liter flask was charged with 7622 parts (11.7 moles) of a 690 molecular weight polytetramethylene glycol. The flask was then connected to the polyester preparation apparatus and the temperature of the flask was raised to 160° C. Nitrogen was bubbled through the flask and 1033 parts (7.1 moles) of adipic acid were slowly added with stirring. The temperature was raised to 220° C. at the completion of the addition. Water was collected in the receiving flask. After the atmospheric cycle, vacuum was slowly applied to the system and more water was distilled over (254 parts total water was collected). The polyetherester had an acid number of less than 1 and an OH number of about 58. The viscosity of the polyetherester at 25° C. was about 4200 mPa.s.

In the experiments which are summarized below, one copolyetherester termed 650 and a second polyetherester termed 250 were prepared. These resins contain structural units conforming to

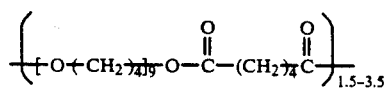
(I)

respectively. In the experiments, the indicated amounts of the polyetherester were added to the polycarbonate (Makrolon 2608 polycarbonate, a product of Mobay Corporation) and the composition processed conventionally. The properties of the compositions thus prepared were determined and are summarized below.

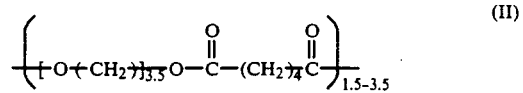
(II)

TABLE 1

| Additive Type/amount | Melt Flow Index @ 300C (g/10 min) | Elongation range (%) | Impact Strength ft. lb./in. ⅛" | ¼" |
|---|---|---|---|---|
| 0 | 12.9 | 105–130 | 15.9 | 2.4 |
| 250/1 | 35.4 | 120–135 | 1.3 | 1.2 |
| 250/5 | 58 | 115–125 | 1.3 | 1.0 |
| 650/1 | 15.5 | 125 | 15.9 | 1.8 |
| 650/5 | 50 | 115–120 | 1.4 | 1.1 |

The results clearly show the efficacy of the copolyetherester in plasticizing the composition of the invention.

In a second set of experiments, the polyetherester termed 650 was incorporated in polycarbonate resins having a high melt flow (grades FCR and CD 2000 of Makrolon polycarbonate resin) and in an aromatic polyestercarbonate (Apec resin, from Mobay Corporation). The processing of the compositions and their testing followed conventional procedures and the results of the evaluations are tabulated below.

TABLE 2

| Composition Resin/additive amount | Melt Flow Index @ 300C (g/10 min)* | Elongation range (%) | Impact Strength ft. lb./in. ⅛" | ¼" |
|---|---|---|---|---|
| FCR/0 | 19.0 | 120 | 14.0 | 2.0 |
| FCR/1.0 | 26.3 | 105–130 | 13.1 | 1.8 |
| FCR/2.0 | 29.7 | 100–115 | 1.8 | 1.6 |
| CD-2000/0 | 70.0 | | | |
| CD-2000/3 | 102.0 | | | |
| CD-2000/5 | 170.2 | | | |
| APEC/0 | 9.3 | 85 | 7.0 | 6.0 |
| APEC/1 | 16.3 | 35–40 | 6.9 | 4.3 |
| APEC/3 | 23.1 | 55–85 | 7.3 | 3.1 |

*The melt flow rates of the APEC based compositions were determined at @ 360C.

The results clearly demonstrate the efficacy of the polyetherester of the invention in plasticizing polycarbonate resins and polyestercarbonates.

Although the invention has been described in detail in the forgoing for the purpose of illustration, it is to be understood that such detail is solely for that purpose and that variations may be made therein by those skilled in the art without departing from the spirit and scope of the invention except as it may be limited by the claims.

What is claimed is:

1. A thermoplastic molding composition comprising
   (i) at least one member selected from the group consisting of polycarbonate resin and aromatic polyestercarbonate, and
   (ii) a thermoplastic copolyetherester having a weight average molecular weight of about 2000 conforming to

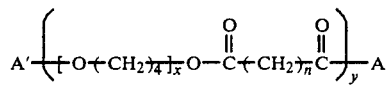

wherein x is about 2 to 15, n is about 3 to 10 and y is about 1 to 10. A and A' are end groups which may independently be a hydroxy group, a carboxy radical, a $C_1$—$C_8$ alkoxy or a $C_6$—$C_{10}$ aryloxy group, said (ii) being present in an amount sufficient to increase the melt flow index of said member.

2. The composition of claim 1 wherein said (ii) is present in an amount of 0.5 to 20.0 percent relative to the weight of the composition.

3. The composition of claim 1 wherein said x is 9, n is 4 and y is about 1.5 to 3.5.

4. The composition of claim 3 wherein said x is 3.5.

5. The composition of claim 1 wherein said polycarbonate is a homopolycarbonate based on bisphenol-A.

6. A method to increase the melt flow index of a thermoplastic resin selected from the group consisting of aromatic polycarbonate and aromatic polyestercarbonate comprising incorporating therewith an amount of a copolyetherester having a weight average molecular weight of about 2000, conforming to

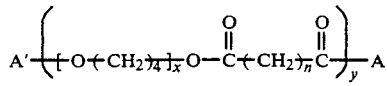

wherein x is about 2 to 15, n is about 3 to 10 and y is about 1 to 10. A and A' are end groups which may independently be a hydroxy group, a carboxy radical, a $C_1$—$C_8$ alkoxy or a $C_6$—$C_{10}$ aryloxy group, said amount being sufficient to increase the melt flow index of said resin.

7. The method of claim 6 wherein said x is 9, n is 4 and y is about 1.5 to 3.5.

8. The method of claim 7 wherein said x is 3.5.

9. The method of claim 6 wherein said amount is about 0.5 to 20.0 percent relative to the weight of said resin plus the weight of said copolyetherester.

* * * * *